(12) United States Patent
Mickle et al.

(10) Patent No.: US 7,852,749 B2
(45) Date of Patent: Dec. 14, 2010

(54) METHODS AND SYSTEMS FOR ROUTING TELECOMMUNICATIONS

(75) Inventors: Garrett Mickle, Newport, NC (US); Robert Smith, Santa Barbara, CA (US); David S. Trandal, Santa Barbara, CA (US)

(73) Assignee: Callwave, Inc., Santa Barbara, CA (US)

( * ) Notice: Subject to any disclaimer, the term of this patent is extended or adjusted under 35 U.S.C. 154(b) by 856 days.

(21) Appl. No.: 11/100,004

(22) Filed: Apr. 6, 2005

(65) Prior Publication Data

US 2006/0227766 A1 Oct. 12, 2006

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/66* (2006.01)
*H04L 12/28* (2006.01)
*H04L 12/56* (2006.01)
*H04J 3/16* (2006.01)
*H04J 3/22* (2006.01)

(52) U.S. Cl. .................. 370/217; 370/231; 370/235; 370/353; 370/354; 370/356; 370/395.21; 370/395.42; 370/437; 370/465

(58) Field of Classification Search ................ 370/356
See application file for complete search history.

(56) References Cited

U.S. PATENT DOCUMENTS 3,936,613 A 2/1976 Nishigori et al.

3,956,595 A 5/1976 Sobanski (Continued)

FOREIGN PATENT DOCUMENTS

CA 1329852 9/1989

(Continued)

OTHER PUBLICATIONS

Intelligent Media Gateway Selection in a VoIP Network by Adiseshu Hari, Volker Hilt, and Markus Hofmann, Bell Labs Technical Journal, May 5, 2005.*

(Continued)

*Primary Examiner*—Daniel J Ryman
*Assistant Examiner*—Nishant B Divecha
(74) *Attorney, Agent, or Firm*—Knobbe, Martens, Olson & Bear LLP

(57) ABSTRACT

Methods and systems of routing calls over a network are described herein. A latency measurement is performed for at least a plurality of portions of a plurality of network paths and storing latency measurement information in computer readable memory. A dropped packet measurement is performed for at least portions of the plurality of network paths and storing dropped packet measurement information in computer readable memory. A call origination request is received. A network routing path is selected from the plurality of network paths, the network paths including a call manager, based at least in part on the latency measurement information and the dropped packet measurement information. A proxy system associated with a SIP provider is informed of the call. The call manager in the selected network path generates the call.

9 Claims, 3 Drawing Sheets

U.S. PATENT DOCUMENTS

| | | | |
|---|---|---|---|
| 4,009,337 A | 2/1977 | Sakai et al. | |
| 4,022,983 A | 5/1977 | Braun et al. | |
| 4,485,470 A | 11/1984 | Reali | |
| 4,736,405 A | 4/1988 | Akiyama | |
| 4,809,321 A | 2/1989 | Morganstein et al. | |
| 4,893,336 A | 1/1990 | Wuthnow | |
| 4,994,926 A | 2/1991 | Gordon et al. | |
| 5,040,208 A | 8/1991 | Jolissaint | |
| 5,046,087 A | 9/1991 | Sakai | |
| 5,291,302 A | 3/1994 | Gordon et al. | |
| 5,404,537 A | 4/1995 | Olnowich et al. | |
| 5,434,908 A | 7/1995 | Klein | |
| 5,459,584 A | 10/1995 | Gordon et al. | |
| 5,467,388 A | 11/1995 | Redd, Jr. et al. | |
| 5,526,524 A | 6/1996 | Madduri | |
| 5,533,102 A | 7/1996 | Robinson et al. | |
| 5,533,106 A | 7/1996 | Blumhardt | |
| 5,577,111 A | 11/1996 | Iida et al. | |
| 5,583,918 A | 12/1996 | Nakagawa | |
| 5,619,557 A | 4/1997 | Van Berkum | |
| 5,640,677 A | 6/1997 | Karlsson | |
| 5,651,054 A | 7/1997 | Dunn et al. | |
| 5,668,861 A | 9/1997 | Watts | |
| 5,742,596 A * | 4/1998 | Baratz et al. | 370/356 |
| 5,751,795 A | 5/1998 | Hassler et al. | |
| 5,774,067 A | 6/1998 | Olnowich et al. | |
| 5,805,587 A | 9/1998 | Norris et al. | |
| 5,809,128 A | 9/1998 | McMullin | |
| 5,812,551 A | 9/1998 | Tsukazoe et al. | |
| 5,825,867 A | 10/1998 | Epler et al. | |
| 5,832,060 A | 11/1998 | Corlett et al. | |
| 5,835,573 A | 11/1998 | Dee et al. | |
| 5,894,504 A | 4/1999 | Alfred et al. | |
| 5,946,386 A | 8/1999 | Rogers et al. | |
| 5,960,064 A | 9/1999 | Foladare et al. | |
| 5,960,073 A | 9/1999 | Kikinis et al. | |
| 5,963,629 A | 10/1999 | Jung | |
| 5,995,594 A | 11/1999 | Shaffer et al. | |
| 5,995,603 A | 11/1999 | Anderson | |
| 6,014,436 A | 1/2000 | Florence et al. | |
| 6,032,051 A | 2/2000 | Hall et al. | |
| 6,034,956 A | 3/2000 | Olnowich et al. | |
| 6,035,031 A | 3/2000 | Silverman | |
| 6,044,059 A | 3/2000 | Olnowich | |
| 6,075,784 A * | 6/2000 | Frankel et al. | 370/356 |
| 6,078,581 A | 6/2000 | Shtivelman et al. | |
| 6,104,800 A | 8/2000 | Benson | |
| 6,144,644 A | 11/2000 | Bajzath et al. | |
| 6,160,881 A | 12/2000 | Beyda et al. | |
| 6,167,127 A | 12/2000 | Smith et al. | |
| 6,169,795 B1 | 1/2001 | Dunn et al. | |
| 6,169,796 B1 | 1/2001 | Bauer et al. | |
| 6,175,622 B1 | 1/2001 | Chiniwala et al. | |
| 6,178,183 B1 | 1/2001 | Buskirk, Jr. | |
| 6,181,691 B1 | 1/2001 | Markgraf et al. | |
| 6,208,638 B1 | 3/2001 | Rieley et al. | |
| 6,212,261 B1 | 4/2001 | Meubus et al. | |
| 6,230,009 B1 | 5/2001 | Holmes et al. | |
| 6,243,378 B1 | 6/2001 | Olnowich | |
| 6,253,249 B1 | 6/2001 | Belzile | |
| 6,278,704 B1 | 8/2001 | Creamer et al. | |
| 6,304,565 B1 | 10/2001 | Ramamurthy | |
| 6,310,939 B1 | 10/2001 | Varney | |
| 6,350,066 B1 | 2/2002 | Bobo, II | |
| 6,353,660 B1 | 3/2002 | Burger et al. | |
| 6,353,663 B1 | 3/2002 | Stevens et al. | |
| 6,363,414 B1 | 3/2002 | Nicholls et al. | |
| 6,405,035 B1 | 6/2002 | Singh | |
| 6,411,601 B1 | 6/2002 | Shaffer et al. | |
| 6,411,805 B1 | 6/2002 | Becker et al. | |
| 6,426,955 B1 * | 7/2002 | Gossett Dalton et al. | 370/401 |
| 6,438,216 B1 | 8/2002 | Aktas | |
| 6,438,222 B1 | 8/2002 | Burg | |
| 6,449,259 B1 * | 9/2002 | Allain et al. | 370/253 |
| 6,477,246 B1 | 11/2002 | Dolan et al. | |
| 6,496,569 B2 | 12/2002 | Pelletier et al. | |
| 6,496,576 B2 | 12/2002 | Tanaka et al. | |
| 6,501,750 B1 | 12/2002 | Shaffer et al. | |
| 6,505,163 B1 | 1/2003 | Zhang et al. | |
| 6,510,162 B1 | 1/2003 | Fijolek et al. | |
| 6,510,417 B1 | 1/2003 | Woods et al. | |
| 6,512,930 B2 | 1/2003 | Sandegren | |
| 6,519,258 B1 | 2/2003 | Tsukazoe et al. | |
| 6,539,084 B1 | 3/2003 | Long | |
| 6,546,087 B2 | 4/2003 | Shaffer et al. | |
| 6,549,612 B2 | 4/2003 | Gifford et al. | |
| 6,553,222 B1 | 4/2003 | Weiss | |
| 6,564,264 B1 | 5/2003 | Creswell et al. | |
| 6,564,321 B2 | 5/2003 | Bobo, II | |
| 6,567,505 B1 | 5/2003 | Omori et al. | |
| 6,574,319 B2 | 6/2003 | Latter et al. | |
| 6,621,892 B1 | 9/2003 | Banister et al. | |
| 6,643,034 B1 | 11/2003 | Gordon et al. | |
| 6,658,100 B1 | 12/2003 | Lund | |
| 6,661,785 B1 | 12/2003 | Zhang et al. | |
| 6,662,232 B1 | 12/2003 | Nicholls et al. | |
| 6,690,651 B1 * | 2/2004 | Lamarque et al. | 370/252 |
| 6,690,785 B1 | 2/2004 | Stelter et al. | |
| 6,751,299 B1 | 6/2004 | Brown et al. | |
| 6,757,367 B1 * | 6/2004 | Nicol | 379/90.01 |
| 6,775,370 B2 | 8/2004 | Burg | |
| 6,782,088 B1 | 8/2004 | Gabara | |
| 6,785,021 B1 | 8/2004 | Gordon et al. | |
| 6,792,094 B1 | 9/2004 | Kirkpatrick | |
| 6,816,464 B1 * | 11/2004 | Scott et al. | 370/252 |
| 6,857,074 B2 | 2/2005 | Bobo, II | |
| 6,898,275 B2 | 5/2005 | Dolan et al. | |
| 6,968,174 B1 | 11/2005 | Trandal et al. | |
| 6,985,961 B1 * | 1/2006 | Ramsayer et al. | 709/238 |
| 7,002,973 B2 * | 2/2006 | MeLampy et al. | 370/401 |
| 7,003,087 B2 | 2/2006 | Spencer et al. | |
| 7,012,888 B2 * | 3/2006 | Schoeneberger et al. | 370/217 |
| 7,075,921 B2 * | 7/2006 | Siegrist et al. | 370/352 |
| 7,079,498 B2 * | 7/2006 | Ubale | 370/286 |
| 7,154,625 B2 * | 12/2006 | El-Gazzar et al. | 358/1.15 |
| 7,173,910 B2 * | 2/2007 | Goodman | 370/252 |
| 7,188,167 B2 * | 3/2007 | Hallin | 709/223 |
| 7,218,626 B2 * | 5/2007 | Shaheen et al. | 370/338 |
| 7,260,062 B2 * | 8/2007 | Bowen et al. | 370/232 |
| 7,324,530 B2 * | 1/2008 | Jo et al. | 370/401 |
| 2002/0010616 A1 | 1/2002 | Itzhaki | |
| 2002/0016937 A1 * | 2/2002 | Houh | 714/43 |
| 2002/0097710 A1 | 7/2002 | Burg | |
| 2002/0181424 A1 * | 12/2002 | Shaheen et al. | 370/338 |
| 2003/0039339 A1 | 2/2003 | Luehrig et al. | |
| 2003/0058851 A1 * | 3/2003 | Goldman | 370/389 |
| 2003/0063731 A1 | 4/2003 | Woodring | |
| 2003/0076815 A1 * | 4/2003 | Miller et al. | 370/352 |
| 2003/0097447 A1 * | 5/2003 | Johnston | 709/227 |
| 2003/0123629 A1 | 7/2003 | Hussain et al. | |
| 2003/0156700 A1 | 8/2003 | Brown et al. | |
| 2003/0191841 A1 * | 10/2003 | DeFerranti et al. | 709/226 |
| 2004/0028203 A1 | 2/2004 | Wurster et al. | |
| 2004/0032862 A1 * | 2/2004 | Schoeneberger et al. | 370/352 |
| 2004/0125794 A1 * | 7/2004 | Marquette et al. | 370/355 |
| 2004/0190706 A1 | 9/2004 | Fleischer, III et al. | |
| 2004/0196867 A1 * | 10/2004 | Ejzak et al. | 370/468 |
| 2004/0258220 A1 | 12/2004 | Levine et al. | |
| 2005/0053216 A1 | 3/2005 | Spencer et al. | |
| 2005/0123118 A1 | 6/2005 | Terry et al. | |
| 2005/0207556 A1 | 9/2005 | Gonzalez et al. | |
| 2005/0265322 A1 | 12/2005 | Hester | |
| 2006/0013374 A1 | 1/2006 | Fleischer, III et al. | |

| | | | | |
|---|---|---|---|---|
| 2006/0039397 | A1* | 2/2006 | Hari et al. | 370/431 |

FOREIGN PATENT DOCUMENTS

| | | |
|---|---|---|
| EP | 1 120 954 | 8/2001 |
| EP | 1120954 | 8/2001 |
| JP | 10-513632 | 12/1998 |
| JP | 11-506292 | 6/1999 |
| JP | 2001-168989 | 6/2001 |
| WO | WO 97/26749 | 7/1997 |
| WO | WO 00 60840 | 10/2000 |
| WO | WO 01/76210 | 10/2001 |

OTHER PUBLICATIONS

SIP proxy-to-proxy extensions for supporting DCS by Marshall Jun. 2000 published by IEFT.*

A New VoIP Call Admission Control Scheme with Use of Alternate Routing for Low Call Loss Probability by Ezaki et al. IEEE Comunications Society published 2004.*

Requirements for Resource Priority Mechanisms for Session Initiation Protocol (SIP) by Schulzrinne (RFC 3487), Feb. 2003.*

A Framework for Telephony Routing over IP by Rosenberg (RFC 2871), Jun. 2000 published by IEFT.*

RTP Payload for DTMF Digits, Telephony Tones and Telephony Signals, RFC 2833, Schulzrinne et al, 2000.*

A Technical FAQ, *Frequently Asked Questions About Voice and Video over IP Networks*, Jan. 2003 Wainhouse Research, pp. 1-10.

IP Convergence in Global Telecommunications Voice over Internet Protocol (VoIP), Department of Defence.

Introducing voice over Internet protocol technology by Ryan Kereliuk, Oct. 2003.

Service Oriented Architecture for VoIP conferencing, Indiana University Research Park, IN, USA.

http://www.frameip.com/rfc/rfc2543.php, SIP: Session Initiation Protocol, pp. 1-91.

Johnson, Dave; Article; "Now You're Talking—voice—response systems for home offices—Product Information"; http://www.findarticles.com; Feb. 1999.

* cited by examiner

METHODS AND SYSTEMS FOR ROUTING TELECOMMUNICATIONS

BACKGROUND OF THE INVENTION

1. Field of the Invention

The present invention is related to telecommunications, and in particular, to methods and systems for routing communications over a telecommunication system.

2. Description of the Related Art

Internet protocol telephony (IPT) is becoming an increasingly important technology for electronic communications. IPT can include the transport of telephone calls wholly or partly over the Internet. Calls can be placed and received using traditional telephony devices, multimedia computers, or dedicated IPT terminals, by way of example. IPT can be used for voice calls, video/voice calls, and to exchange data. IPT can result in a significant reduction in call cost for users, and can offer enhanced services.

However, certain conventional implementations can suffer with significant drawbacks as compared to conventional POTs (plain old telephone) systems. For example, call quality can be significantly degraded as result of the dropped packets and latency between systems.

SUMMARY OF THE INVENTION

The present invention is related to telecommunications, and in particular, to methods and systems for routing communications over a telecommunication system. For example, certain embodiments can advantageously cause calls to be routed so as to enhance call quality. By way of illustration, systems and methods are described that select network. and/or component paths so as to reduce latencies and/or dropped communication packets. In addition, systems and methods are described for testing network paths and/or system performance. For example, techniques are described herein for detecting and measuring drop or lost packets and latencies. By selecting network communication paths that offer relatively better performance, users can experience enhanced call performance for voice, data, and/or other media communications.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

DETAILED DESCRIPTION OF PREFERRED EMBODIMENTS

Figure 1:
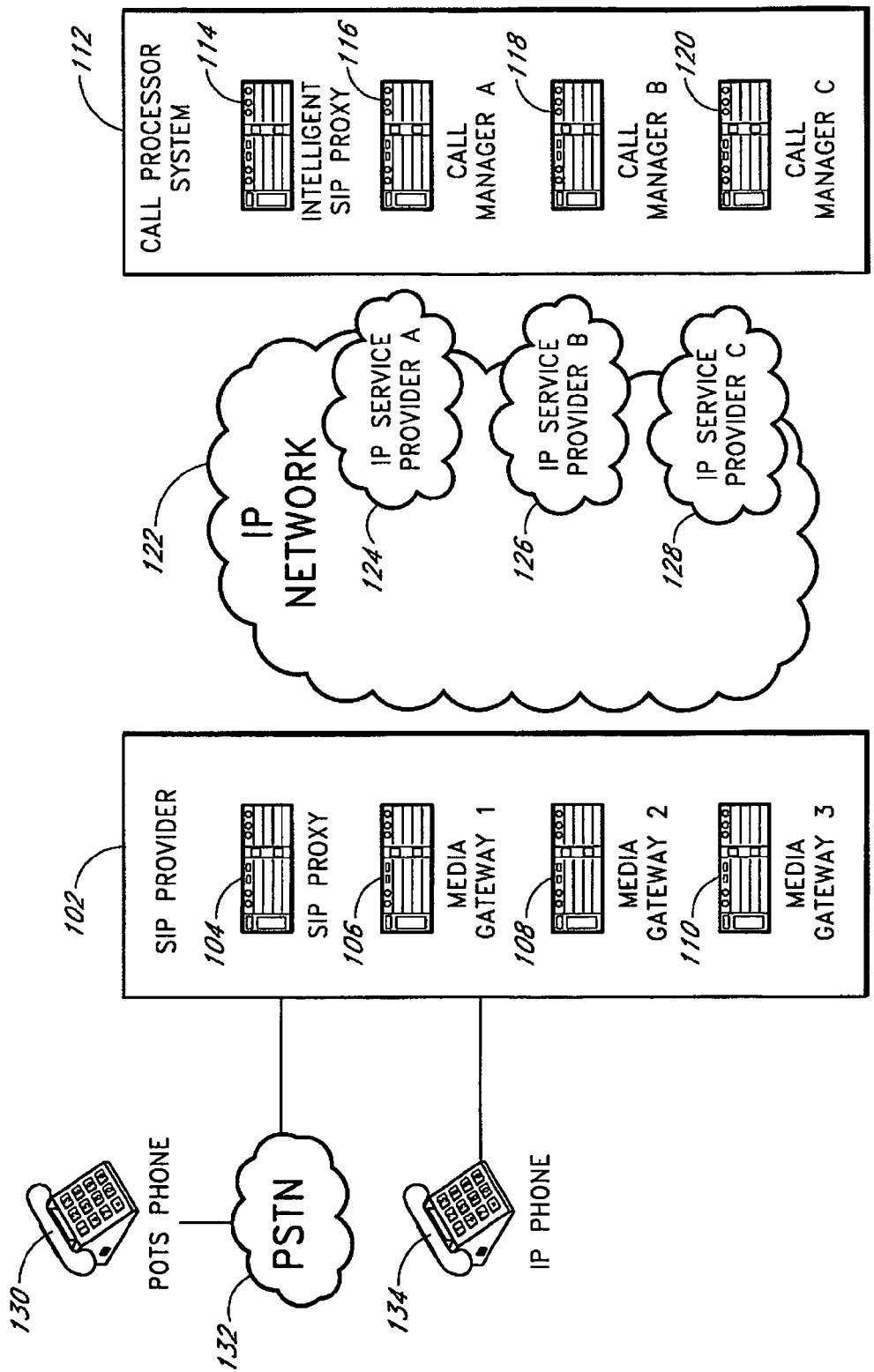
FIG. 1 illustrates an example SIP operating environment.

The present invention is related to telecommunications, and in particular, to methods and systems for routing communications over a telecommunication system. For example, certain embodiments can advantageously cause calls to be routed so as to enhance call quality. By way of illustration, systems and methods are described that select network and/or component paths so as to reduce latencies and/or dropped packets. In addition, systems and methods are described for testing network paths and/or system performance. By selecting network communication paths that offer relatively better performance, users can experience enhanced call performance for voice, data (such as computer data), and/or other media communications.

While the following description relates to an embodiment utilizing the Internet and related protocols, other networks, such as networks of interactive televisions or of telephones, and other protocols may be used as well. Further, while certain protocols, such as IP, SIP, RTP, and so on, are referred to, the present invention is not limited to use with these protocols, or with any particular version of these protocols.

The functions described herein are optionally performed by executable code and instructions stored in computer readable memory and running on one or more general-purpose computers equipped with networking devices. However, the present invention can also be implemented using special purpose computers, state machines, signal processing chips, and/or hardwired electronic circuits. Further, with respect to the example processes described herein, not all the process states need to be reached, nor do the states have to be performed in the illustrated order. Further, certain process states that are illustrated as being serially performed can be performed in parallel.

Similarly, while the following examples may refer to a user's POTs or mobile telephone, other electronic systems can be used as well, such as, without limitation, a personal computer, an interactive television, a networked-enabled personal digital assistant (PDA), other IP (Internet Protocol) device, a networked navigation system, a networked game console, a networked MP3 device, a networked entertainment device, and so on.

As discussed above, certain conventional implementations of Internet Protocol Telephony can have significant drawbacks as compared to conventional POTs (plain old telephone) systems. For example call quality can be significantly degraded as result of the dropped packets and latency between systems. Certain systems and methods are described for reducing or overcoming such drawbacks.

Internet protocol telephony, such as VoIP (voice over Internet protocol), may use, in whole or in part, the Session Initiation Protocol (SIP) as the signaling protocol. SIP is a standardized signaling protocol which can be used for Internet conferencing, telephony, presence, events notification and instant messaging. The Session Initiation Protocol is currently an Internet Engineering Task Force (IETF) standard protocol. There may be several versions and implementations of SIP.

A call may be routed partially over the Internet, using SIP, and partially over a circuit-switched network, such as a PSTN (public switched telephone network). The PSTN may utilize a variety of signaling and other standards, such as the SS7 signaling protocol.

SIP is a request-response protocol. In one embodiment, SIP can be used for establishing, manipulating and tearing down user sessions, wherein several users can optionally participate in a session. A session can optionally involve multimedia elements including audio, video, instant messaging, and/or other real-time data communications. By way of further example, a session can be an Internet multimedia conference, an Internet telephone call and/or a multimedia distribution session. Optionally, session members can communicate using multicast and/or using a mesh of unicast relations.

SIP can optionally run over UDP (User Datagram Protocol), TCP, IP, ATM, X.25 and/or other protocols. In one embodiment, SIP can work in the Application layer of the Open Systems Interconnection (OSI) communications model.

In one embodiment, SIP invitations are used to create sessions. The invitation can carry session descriptions which enable participants to agree on a set of compatible media types. SIP enables user mobility by providing proxy services and redirecting requests to the user's current location. For example, users can register their current location so that calls can be directed to a telephone or other terminal corresponding to the location.

An example system that can be used to support SIP can include some or all of the following components:

1. An endpoint component, sometimes referred to as a user agent (UA), which can be a hardware and/or software device implementing or compatible with SIP, such as an Internet Protocol (IP) phone or other terminal. The endpoint components can include a client used to initiate calls and a server used to answer calls. By way of further example, a SIP Proxy, a call manager, and a SIP phone, which are discussed herein, can be SIP endpoints.

2. A SIP network server that handles signaling associated with one or more calls. By way of example, in an optional embodiment, the network server provides name resolution and user location. The SIP network server can include one or more additional servers. For example, the SIP server can include a Register server used to receive registration messages from endpoints regarding current user location. Using a mapping database, the Register server can map the SIP addresses with the physical location or locations in the domain where the endpoint is located. The SIP network server can also include a proxy system that transmits call setup and tear down information and optionally forwards SIP messages to multiple proxy servers, creating a search tree, in order for the SIP messages to reach their destination. In addition, a SIP proxy can discover endpoint characteristics of an endpoint by consulting a list of registration templates, including dynamic configuration parameters, for that endpoint. The network server can also include a SIP Redirect server that enables endpoints to locate a desired address by redirecting one or more of the endpoint to another server.

SIP addresses can be the form of uniform resource locators (URL). By way of example, SIP addresses can optionally be embedded in Web pages. In certain applications, a user can click on a SIP address embedded in a Web or other electronic document, and in response, a call can be placed from the user terminal to the SIP address, and the user can then talk to the person or system associated with the SIP address and/or send data files to the person or system associated with the SIP address.

When making a SIP call using a SIP terminal, the SIP terminal locates the appropriate server and then sends a SIP request, such as an invitation that initiates a session. The request may directly reach the intended call recipient, or the request may be redirected or may trigger a chain of new SIP requests by proxies. If a call is to be routed through a number of different proxy servers, a redirect server can be used. When a caller's user agent sends an INVITE request to the redirect server, the redirect server contacts the location server to determine the path to the called party, and then the redirect server sends that information back to the caller. The caller terminal then acknowledges receipt of the information. The caller terminal then sends a request to the device indicated in the redirection information (which could be the call recipient terminal or another server that will forward the request). Once the request reaches the call recipient terminal, the recipient terminal transmits a response and the caller acknowledges the response.

The Real Time Protocol (RTP), Real Time Control Protocol (RTCP), and/or other appropriate protocols can be used to send audio using packets over the Internet to allow the caller and call recipient to verbally communicate. By way of example, the packets can optionally be UDP packets.

Optionally, calls directed to one more selected numbers can be routed by a SIP provider to a call processing system optionally operated by a separate entity than the SIP provider. The call processing system can provide telephone services by integrating with one or more Internet Services Providers (ISP), SIP providers, networks, and/or other telephony providers.

The call processing system can include one or more call manager systems, which are computer-based platforms that host one or more call handling applications, such as call answering and message recording, call screening, call forwarding, call bridging, and/or call conferencing applications. The call manager can also optionally detect when a subscriber computer, such as a personal computer, is accessing the Internet or other network via a client application executing on the subscriber computer that transmits an "I'm alive" message over the Internet which is then received by the call manager. The call manager can then selectively transmit information regarding incoming calls, caller messages in the process of being recorded, and/or recorded caller messages when it is determined that a subscriber computer is connected to the Internet and so may be able to receive the information.

The call processing system optionally operates in both a circuit switched PSTN environment and a packet switched IP environment (such as a VoIP environment). In the latter case, inbound PSTN calls are converted at media gateways into packetized data streams. The media gateways are optionally located at or operated by a SIP provider. The packetized data streams are then transmitted over a network, such as one or more private data networks and/or the Internet, to the call processing system, which can include one or more call managers located at one or more locations. The call managers can optionally be distributed over large geographic areas. Optionally, if a call is placed using an IP phone or other terminal, the voice (and other) data is already packetized, and is transmitted over the Internet (or other appropriate network) to the SIP provider.

The call processing system can route calls over routing paths selected to improved call quality. For example, the call processing system can selectively route inbound calls received via the SIP provider to call managers so as to reduce latencies in communications with the SIP provider. By way of further example, the call processing system selectively routes outbound calls by selecting call managers and IP providers so as to reduce latencies and/or dropped packets. In one embodiment, the routing decisions are made by a proxy system, sometimes referred to herein as an intelligent SIP proxy. The routing decisions can be based on quality scoring.

For example, a score can be assigned to a given network path or system based on an associated communication latency and/or the number of dropped packets. Different weightings can optionally be assigned to a given latency measurement and a given dropped packet measurement. The latency and dropped packet weightings can be different for different types of media. For example, it may be more critical to avoid dropped packets than to incur some latency for data communications, and so the intelligent SIP proxy will optionally weigh the dropped package measurement as being more important than the latency measurement. For a voice communication, low latency may be more important in achieving a good quality communication path than an occasional dropped packet.

By way of example, the following formula can be used to calculate a network score, wherein a lower score indicates better performance.

Quality Score=Weighting$_{Latency}$(normalized (latency measurement))+Weighting$_{DroppedPackets}$(normalized (number of dropped packets in a measurement window))

In addition, or alternatively, network paths can be ranked using Boolean and numerical equations. For example, the ranking may rank all relevant network paths having no dropped packets higher than those relevant network paths having dropped packets, regardless of the latency measurements of the network paths. Then, those network paths having no dropped packets will be ranked according to their measured or predicted latencies, wherein the network path with the lowest measured or predicted latency will be ranked at the highest quality network path.

FIG. 1 illustrates an example SIP operating environment. For clarity, not all components involved in a communication are illustrated.

A SIP provider system 102 provides SIP telephony services over the public and/or private IP networks. The SIP provider 102 can provide services to a plurality of users and communication terminals, such as IP telephone 134 and a standard POTs telephone 130. The POTs telephone 130 is coupled to the SIP provider 102 via the PSTN 132. The SIP provider system 102 includes or operates a SIP proxy 104 that provides registration, call routing, and/or failure handling, and transmits call setup and tear down information.

The provider system 102 also includes or operates a media gateway, such as media gateways 106, 108, or 110, that converts standard telephony traffic, such as that transmitted over switched circuits, into SIP media streams on an IP network. By way of example and not limitation, the media gateway 106 optionally packetizes voice data from broadband links, such as T1 links, to Real Time Protocol (RTP), and vice versa. The media gateways 106, 108, 110 are optionally connected to diverse IP networks.

A call processing system 112 provides telephony features and services by integrating with one or more telephony service providers and with one or more Internet Service Providers (ISPs). Advantageously, by interfacing to a plurality of ISPs, increased reliability and quality can be provided by selecting the ISP for a given call or group of calls that is likely to provide enhanced reliability and quality for the call or calls.

The call processing system includes one or more call managers, such as call managers 116, 118, 120, which are platforms for hosting a call handling application. For example, a call manager can provide one or more of call auto-transfer, call forwarding call connect, call screening or fax receipt. A given call manager can interface with one or more Internet Service Providers. A call manager can optionally be implemented as an operating system service, such as a WIN2000 or other service, and can include or operate with an RTP packet handling system.

The example call processing system 112 also includes an intelligent SIP proxy 114 that intelligently routes calls to or from the call managers 116, 118, 120 and acts as a gateway to the SIP provider system. For example, in the case of inbound calls, the call processing system selects the best or preferred call manager to handle the call based on one or more of: the media gateway that is processing originating the call, network performance, and/or call manager availability.

The operation of the intelligent SIP proxy 114 will now be discussed in greater detail. In order to provide its services, the intelligent SIP Proxy 114 discovers the IP addresses of the media gateways within the SIP provider's network as calls are originated from or presented to the intelligent SIP Proxy 114. In addition, the intelligent SIP Proxy stores the respective calling number together with the media gateways IP addresses. As will be discussed later, this allows the Call Processing System 112 to make an intelligent prediction or best guess at to which media gateway the SIP provider will use on an outbound call.

The intelligent SIP proxy 114, or other appropriate system, measures the media network performance. The network performance measurement can optionally be accomplished, at least in part, by measuring the performance between a media gateway and a call manager. For example, the attributes of the network being tested can include latency and/or dropped or lost packets. The latency and/or dropped packet measurement can be performed periodically or upon the occurrence of some other condition or trigger, so that the measurements do not become too stale. This ensures that the measurements reflect the current network performance fairly accurately.

For example, an ICMP (Internet Control Message Protocol) Echo Request packet, also known as a ping, is transmitted directly from a call manager to a media gateway to be tested. The target media gateway, upon receipt of the ICMP Echo Request, builds a corresponding ICMP Echo Reply packet and transmits it back to the call manager that sent the Echo Request. The time between the transmittal of the Echo Request and the receipt of the Echo Reply will provide the intelligent proxy with a good indication of the communication latency. If the gateway does not respond to ICMP requests, the traceroute (tracert) routine can provide an approximation of the latency.

Latency can be measured using other tools. For example, a Test TCP (TTCP) utility can be used to measure TCP or UDP throughput through the IP path between a selected call manager and media gateway. The call manager sends a specified number of TCP (or UDP) packets to the media gateway. At the end of the test, the two sides display the number of bytes transmitted and the time elapsed for the packets to pass from one end to the other. These figures can be used to calculate the actual or estimated throughput on the link between the call manager and media gateway. Other tools, such as pchar, can also be used to measure latency and throughput.

By way of further example, test calls can be placed from a Call Manager directly connected to the PSTN to a phone number hosted by the media gateway to be tested. The inbound call routes through the IP network 122 and terminates on a Call Manager that is being tested. When the call is connected, DTMF tones can be exchanged. The timing of this exchange, that is the time between a sent DTMF and receipt gives an estimated measure of the latency. Optionally, after the exchange, a tone, such as a DTMF tone, can be played. If there are any discontinuities or gaps in the received tone, the discontinuities or gaps will be considered to be indications of dropped packets.

Jitter is the variation in the time between packets arriving, caused by network congestion, timing drift, and/or route changes. Measurement of the jitter in a network path between a Call Manager and media gateway can also be used as a network performance metric, and used in selecting which Call Manager is to handle a call.

As previously discussed, during a SIP call, voice traffic is carried using the RTP/RTCP protocol. RTP packets contain timestamps. In one embodiment, the time stamp field is of length 32 bits. The time stamp reflects the sampling instant of the first octet in the RTP data packet. During a voice call, discontinuities in the timestamps from the RTP stream are considered dropped packets. In addition, if breaks are discontinuities are detected in the RTP sequence numbers of the received RTP packets, a determination is made that the missing sequence numbers correspond to dropped packets. By way of example, the RTP timestamp and sequence number can be located in corresponding RTP packet header fields.

In addition, during a call, an adaptive echo canceller with a long training window can optionally be used. If the call has echo, the echo is likely originating from the far end of the connection. After the echo canceller is trained, the window the canceller is using can provide a measure of the round trip latency for the call. In yet another embodiment, during fax calls, measuring the timing of the handshaking in the T30 protocol provides an estimate approximation of the latency for the call.

By way of further example, one or more of the following criteria are optionally used by the intelligent SIP proxy 114 or other selection device to select which call manager is to handle the call:
  Network quality between a given call manger and the SIP media gateway, wherein the network quality is optionally measured as described above.
  The type of media expected to be presented on the call (for example, data, voice, video, etc.).
  The availability of and the age of performance and/or quality test data for a network path. For example, the decision to place call over a network path may be made in order to generate test data for that network.
  The relative importance or priority of the call based on the called number.
  Which call managers are available and/or their level of availability.
  The available network bandwidth between a given call manager and the media gateway.

Figure 2:
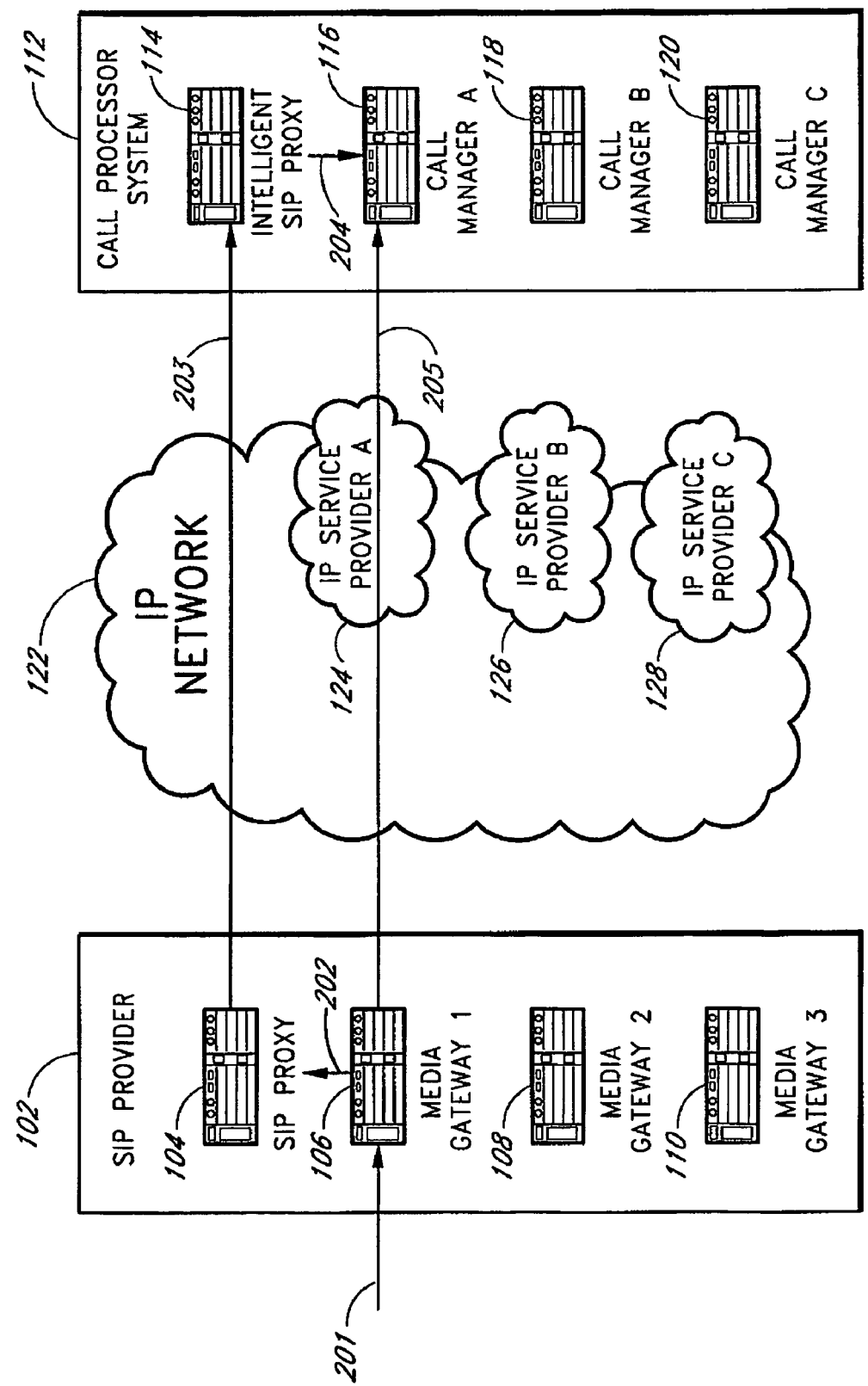
FIG. 2 illustrates an example processing of an inbound call.

Examples of call processing will now be described. FIG. 2 illustrates an example of processing an inbound call. The inbound call is received at state 201 at the SIP media gateway 106 associated with the SIP provider 102. By way of example, the inbound call may have been received from a POTs communication device or a SIP communication device, such as POTs telephone 130 or IP telephone 134 illustrated in FIG. 1. The call may have been placed by dialing a number hosted by or associated with the call processing system 112. The media gateway 106 converts standard telephony traffic into SIP media streams and, at state 202, informs the SIP proxy 104 of the call. At state 203, the SIP proxy 104 transmits call information over the IP network 122 to the intelligent SIP proxy 114 to inform the SIP proxy 114 of the call. The intelligent SIP proxy 114 then selects which of the call managers 116, 118, 120 to service the call. The selection can be based on one or more of the selection criteria discussed above. In this example, the call is routed to a call manager over the network path that provides the lowest latency with no dropped packets, however other selection criteria can be used (e.g. no worse than average latency and no more than one dropped packet every one thousand packets; no dropped packets irrespective of the latency, etc.). In this example, call manager 116 is selected.

At state 204, the call is presented to the selected call manager in the form of an Invite request. The Invite request contains the IP address for the RTP stream from the media gateway. If the Call Manager chooses to accept the call, the Call Manger will answer the Invite request with a response that contains the IP address of its RTP stream. This response travels back through the intelligent SIP proxy 114, to the SIP proxy 104, and back to the media gateway 106. At state 205, the media gateway 106 then sends the media (e.g. voice or data) to selected call manager 116 over the selected network path. In this example, the media is sent by the media gateway 106 over the IP network 122 to call manager 116 via IP service provider A 124.!

Figure 3:
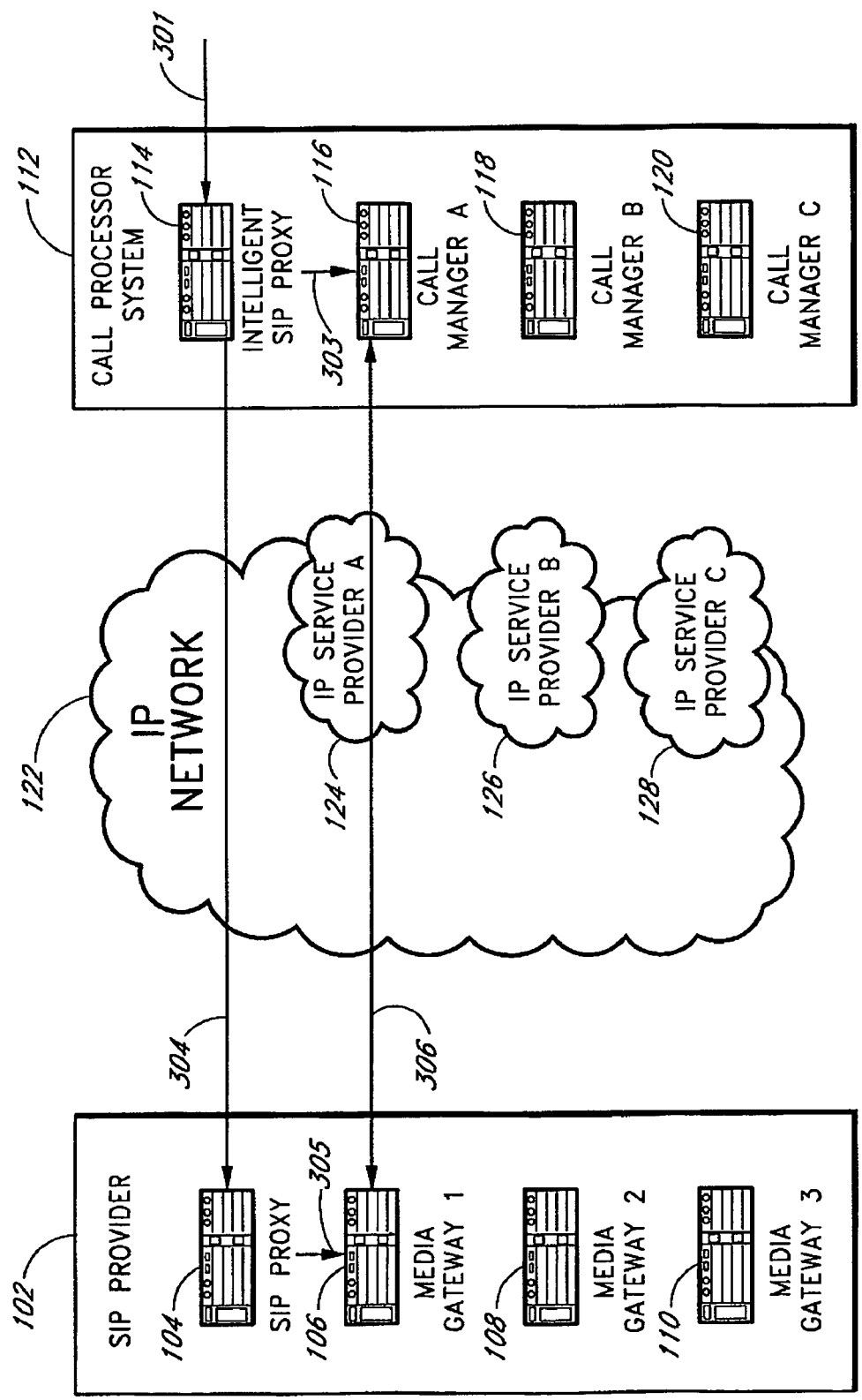
FIG. 3 illustrates an example processing of an outbound call.

FIG. 3 illustrates an example of processing an outbound call. At state 301 a request to originate an outbound call to a specific number is sent to the intelligent SIP proxy 114. The call, by way of example, could have originated from a user selecting an out call option from a client application running on an Internet connected PC 130. This action by the user causes an outbound call request from the client application over the IP network 122 to the call processing system 112. At state 302, the intelligent SIP proxy 114 selects which call manager is to handle the call. In this case, the call is routed over the network path with the lowest latency and no dropped packets, although other selection criteria can be used (e.g. no worse than {specified latency period} and no more than one dropped packet every one thousand packets; no dropped packets irrespective of the latency, etc.). In this example, the intelligent SIP proxy 114 predicts or guesses which media gateway that will likely be chosen based on the called number. Phone number ranges such as NPA, NPA-NXX, and NPA-NXX-Y may be associated with media gateways and stored in the Call Processing System 112 based on previously made or previously received inbound calls. The call manager with the network connection predicted to be most likely to meet the selection criteria (e.g. lowest latency and no dropped packets) to the predicted receiving media gateway is selected to generate the call. In this example, call manager 116 has been selected.

At state 303 the intelligent SIP proxy 114 informs the selected call manager that it has been selected to generate the call and call manager 116 generates the call. At state 304, the intelligent SIP proxy 114 informs the SIP provider SIP Proxy 104 of the call using an Invite message containing the IP address of the Call Manager. At state 305, the SIP provider proxy 114 informs the media gateway 106 of the outbound call. At state 306, the Call Manager 116 with RTP media stream is connected to the media gateway 106.

Thus, as described herein, certain embodiments can advantageously cause calls to be routed so as to enhance call quality, such as by selecting paths that reduce latency and/or reduce dropped packets. Thus, users can experience enhanced call performance for voice, data, and/or other media communications. In addition, optional methods are provided to test network paths and/or system performance, such as, for example, with respect to latencies and dropped packet.

It should be understood that certain variations and modifications of this invention would suggest themselves to one of ordinary skill in the art. The scope of the present invention is not to be limited by the illustrations or the foregoing descriptions thereof.

What is claimed is:

1. A method of routing SIP calls, the method comprising:
  originating a first DTMF tone from a first call manager over a first network path, wherein the first call manager is not associated with a SIP network service provider that provides a first SIP network;
  originating a second DTMF tone from a second call manager over a second network path, wherein the second call manager is not associated with the SIP network service provider;
  performing a latency measurement for at least a portion of the first network path by comparing a time delay from the origination of the first DTMF tone to receipt of the first DTMF tone by the first call manager and storing corresponding first network path latency measurement information in computer readable memory;

performing a dropped packet measurement for at least the portion of the first network path based on discontinuities or gaps in the first DTMF tone when received back by the first call manager and storing corresponding first network path dropped packet measurement information in computer readable memory;

performing a latency measurement for at least a portion of the second network path, by comparing a time delay from the origination of the second DTMF tone to receipt of the second DTMF tone by the second call manager and storing corresponding second network path latency measurement information in computer readable memory;

performing a dropped packet measurement for at least the portion of the second network path, the path based on discontinuities or gaps in the second DTMF tone when received back by the second call manager and storing corresponding second network path dropped packet measurement information in computer readable memory;

receiving an inbound call at the first SIP network, wherein the inbound call is directed to a phone number assigned to an operator not associated with the SIP network provider;

calculating a network quality score for each of the first and second call managers using a formula including:
a first weighting related to latency;
the first network path latency measurement information for the first network path,
wherein the first network path latency information is adjusted using the first weighting when calculating the network quality score for the first call manager;
the second network path latency measurement information,
wherein the second network path latency measurement information for the second network path is adjusted using the first weighting when calculating the network quality score for the second call manager;
a second weighting related to dropped packets, where the first weighting is different than the second weighting;
the first network path dropped packet measurement information,
wherein the first network path dropped packet measurement information is adjusted using the second weighting when calculating the network quality score for the first call manager;
the second network path dropped packet measurement information,
wherein the second network path dropped packet measurement information is adjusted using the second weighting when calculating the network quality score for the second call manager;

selecting, using a computing device, the first call manager or the second call manager to process the inbound call based at least in part on the network quality score for the first call manager and the network quality score for the second call manager;

terminating the inbound call at the selected call manager, wherein the selected call manager is configured to perform one or more of call answering, call screening, call forwarding, call bridging, or call conferencing applications; and receiving at the selected call manager packetized voice media associated with the inbound call from a media gateway associated with the SIP network service provider.

2. The method as defined in claim 1, wherein the selected call manager is selected based in part on a media content type.

3. The method as defined in claim 1, wherein the selected call manager is selected based in part on a priority of a caller or a called party associated with the inbound call.

4. The method as defined in claim 1, wherein the selected call manager is selected based in part on available network bandwidth from the selected call manager to the media gateway.

5. The method as defined in claim 1, wherein a first SIP proxy performs the call manager selection.

6. The method as defined in claim 1, wherein the inbound call is directed to a phone number associated with an operator of the selected call manager.

7. The method as defined in claim 1, the method further comprising selecting the first call manager or the second call manager to process the inbound call based in part on measured jitter in a network path between the first call manager and the media gateway.

8. The method as defined in claim 1, wherein the selected call manager is selected based in part on whether media presented by the inbound call is voice media or video media.

9. The method as defined in claim 1, wherein the selected call manager is selected based in part on a relative priority of the inbound call as determined by the phone number to which the inbound call is directed to.

* * * * *